United States Patent
Li

(10) Patent No.: US 7,607,816 B2
(45) Date of Patent: Oct. 27, 2009

(54) LIGHT GUIDE PLATE AND BACKLIGHT MODULE ADOPTING SAME

(75) Inventor: Rui-Yong Li, Taipei-Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 97 days.

(21) Appl. No.: 11/847,286

(22) Filed: Aug. 29, 2007

(65) Prior Publication Data
US 2008/0151577 A1    Jun. 26, 2008

(30) Foreign Application Priority Data
Dec. 22, 2006    (CN)    ............ 2006 1 0201369

(51) Int. Cl.
*F21V 7/04*    (2006.01)

(52) U.S. Cl. ............ 362/621; 362/608; 362/610; 362/612; 349/65

(58) Field of Classification Search .......... 362/601, 362/612, 613, 615, 617, 621, 622, 600, 608, 362/610; 349/65
See application file for complete search history.

(56) References Cited

U.S. PATENT DOCUMENTS

| | | | |
|---|---|---|---|
| 6,582,095 B1 | 6/2003 | Toyoda | |
| 6,976,779 B2 * | 12/2005 | Ohtsuki et al. | 362/608 |
| 7,309,154 B2 * | 12/2007 | Ohkawa | 362/615 |
| 7,325,958 B2 * | 2/2008 | Yang et al. | 362/621 |
| 2004/0264911 A1 | 12/2004 | Toeda et al. | |
| 2006/0203511 A1 * | 9/2006 | Tseng | 362/608 |
| 2006/0203518 A1 * | 9/2006 | Tseng | 362/621 |
| 2007/0147074 A1 * | 6/2007 | Sakai et al. | 362/608 |
| 2007/0263409 A1 * | 11/2007 | Mok | 362/612 |

* cited by examiner

*Primary Examiner*—Jacob Y Choi
(74) *Attorney, Agent, or Firm*—Frank R. Niranjan

(57) ABSTRACT

A light guide plate includes a light incident surface, a light emission surface intersects with the light incident surface, and a bottom surface opposite to the light emission surface. The light incident surface includes at least a first light receiving region and at least a second light receiving region. The first light receiving region has a distinctly different structure in comparison to the second light receiving region. One end of the first light receiving region communicates with the light emission surface, and the other end of the light receiving region communicates with the bottom surface. One end of the second light receiving region communicates with the light emission surface and, the other end of light receiving region communicates with the light emission surface.

10 Claims, 7 Drawing Sheets

LIGHT GUIDE PLATE AND BACKLIGHT MODULE ADOPTING SAME

BACKGROUND OF THE INVENTION

1. Field of the Invention

The present invention relates to light guide plates used in backlight modules of liquid crystal display devices and, particularly, to a light guide plate having high brightness and uniformity of light emission and to a backlight module adopting the same.

2. Description of Related Art

Liquid crystal display devices have many excellent performance characteristics, such as large-scale information display ability, easy colorization, low power consumption, long life, no pollution associated therewith, and so on. Therefore, liquid crystal display devices are widely used. A typical liquid crystal display device generally includes a backlight module. The backlight module is used to convert linear light sources or point light sources, such as cold cathode ray tubes or light emitting diodes, respectively, into area light sources with high uniformity and brightness.

Referring to FIGS. 6 and 7, a conventional backlight module 10 includes a number of LEDs 12 used as light sources and a light guide plate 13 adjacent to the light sources 12. The light guide plate 13 includes a light incident surface 131 adjacent to the light sources 12, a light emitting surface 132 adjoining the light incident surface 131, and a bottom surface 133 opposite to the light emitting surface 132. In use, incident light beams are emitted from the light sources 12 and are transmitted into light guide plate 13. The light guide plate 13 is used to direct the travel of the incident light beams therein and to ensure that most of the incident light beams can be emitted from the light emitting surface 132 of the light guide plate 13.

However, each LED 12 generally has a limited range of light emission angles. As a result, a number of dark regions 15 tend to be formed in areas of the light guide plate 13, between every two adjacent LEDs 12. A number of bright regions 16, conversely, tend to be formed in areas of the light guiding plate 13, corresponding to each LED 12. Thus, the backlight module 10 can have non-uniform brightness.

What is needed, therefore, is a light guide plate having high brightness and uniformity of light emission, and a backlight module adopting the improved light guide plate. What is also needed is a light guide plate that offers the ability to produce selected lighting characteristics within different regions of the light emission surface thereof.

SUMMARY OF THE INVENTION

A light guide plate, according to a present embodiment, includes a light incident surface, a top light emission surface intersecting with the light incident surface, and a bottom surface. The light incident surface defines at least a first light receiving region and at least a second light receiving region. Each first light receiving region has a different structure in comparison to each second light receiving region. The first and second light receiving regions extend from the top light emission surface to the bottom surface.

A backlight module, according to another embodiment, includes at least two light sources and a light guide plate. The light guide plate includes a light incident surface, a top light emission surface intersecting with the light incident surface, and a bottom surface. The light incident surface includes at least a first light receiving region and at least a second light receiving region. The first light receiving region has a different structure than the second light receiving region. The first and second light receiving regions extend from the top light emission surface to the bottom surface. Each light source is respectively positioned opposite to a corresponding one of a given first light receiving region and a given second light receiving region.

Advantages and novel features will become more apparent from the following detailed description when taken in conjunction with the accompanying drawings.

BRIEF DESCRIPTION OF THE DRAWINGS

Many aspects of the present light guide plate and backlight module can be better understood with reference to the following drawings. The components in the drawings are not necessarily drawn to scale, the emphasis instead being placed upon clearly illustrating the principles of the present light guide plate and backlight module. Moreover, in the drawings, like reference numerals designate corresponding parts throughout the several views.

DETAILED DESCRIPTION OF THE INVENTION

Reference will now be made to the drawings to describe embodiments of the present light guide plate and the backlight module adopting the same, in detail.

Figure 1:
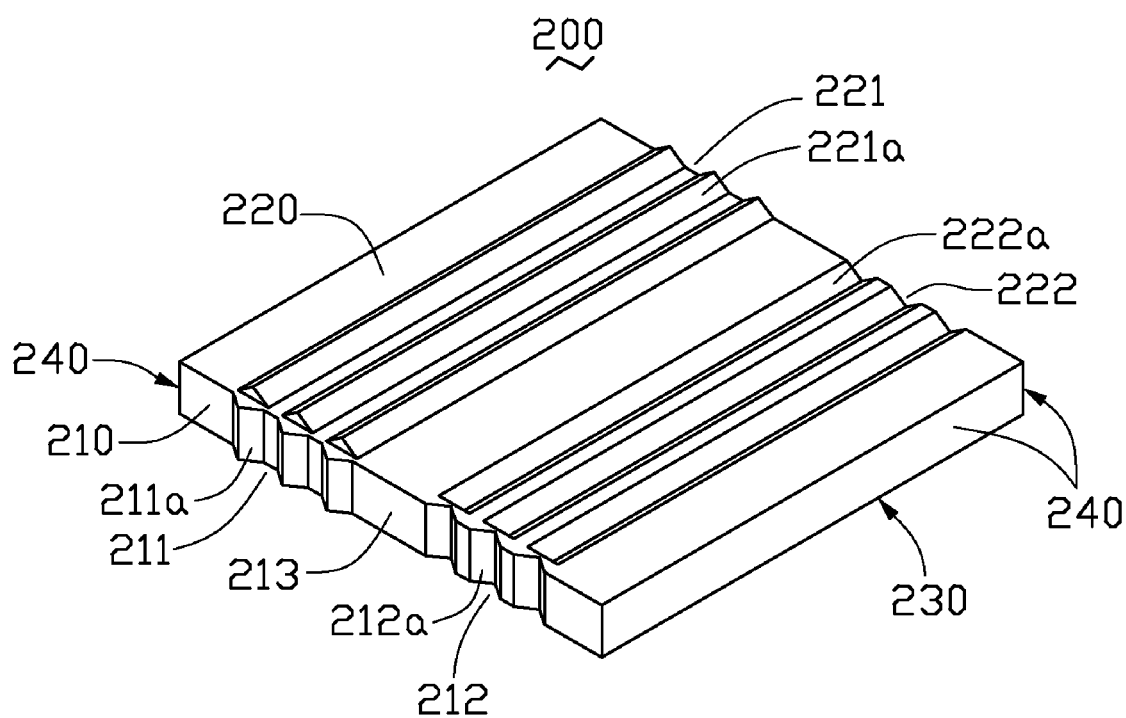
FIG. 1 is an isometric view of a light guide plate in accordance with a first present embodiment.
Figure 2:
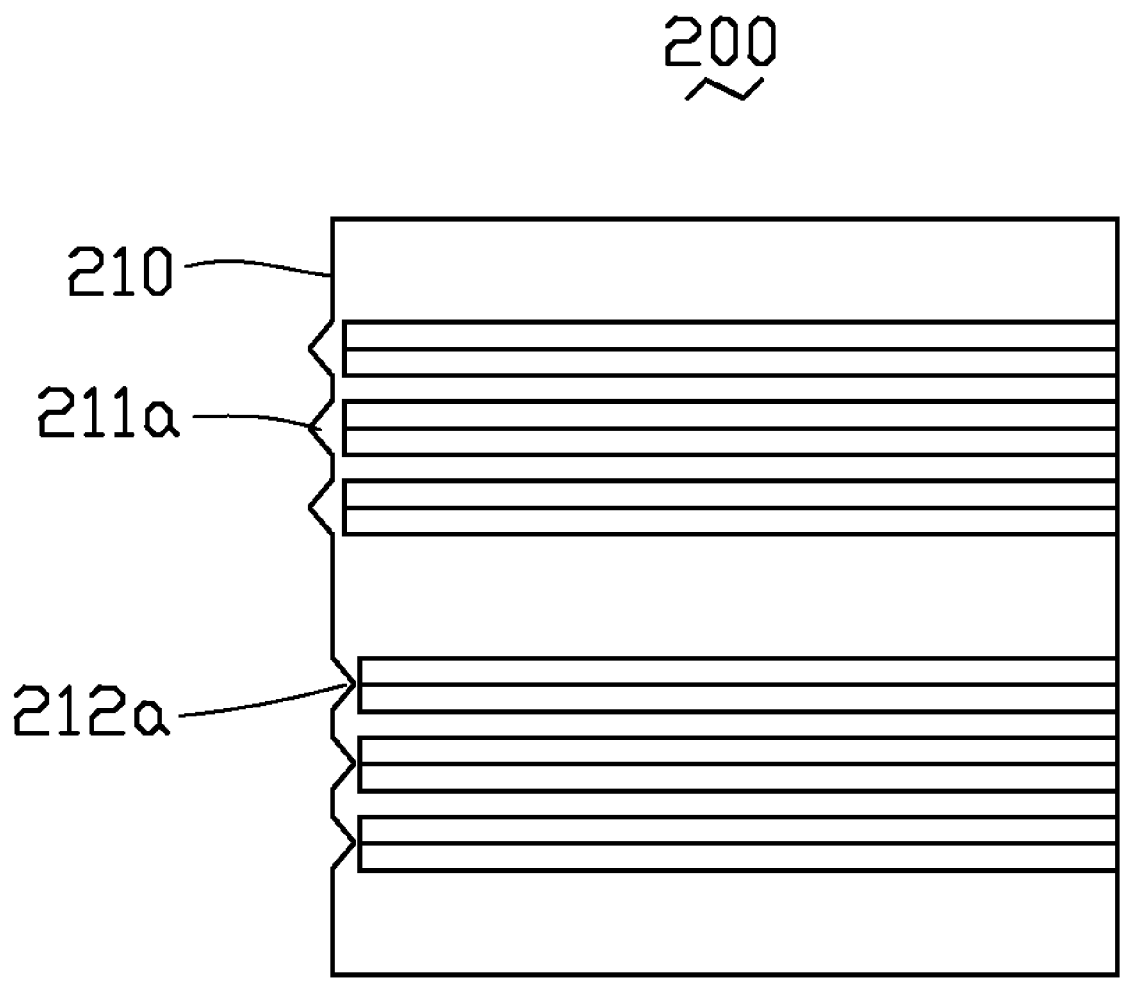
FIG. 2 is a top plan view of the light guide plate of FIG. 1.

Referring to FIGS. 1 and 2, a light guide plate 200, in accordance with a first present embodiment, is illustrated. The light guide plate 200 includes a light incident surface 210, a top light emission surface 220, a bottom surface 230 and a number of side surfaces 240. The light emission surface 220 intersects with the light incident surface 210 and is substantially perpendicular to the light incident surface 210. The bottom surface 230 intersects with the light incident surface 210. The side surfaces 240, in turn, extend from the light emission surface 220 to the bottom surface 230, and intersect with each other.

The light incident surface 210 includes at least two light receiving regions, and each light receiving region itself is configured for a particular light guiding performance. For example, the light guide plate 200 includes at least a first light receiving region 211 and at least a second light receiving region 212. As shown, each first light receiving region 211 may advantageously include a number of convexities (e.g., triangular or arcuate protrusions). Correspondingly, each second light receiving region 212 usefully may include a number of concavities (e.g., triangular or arcuate indents). It is to be understood that the relative location of the convexities and the concavities could be switched. Also, alternatively, each first light receiving region 211 and each second light receiving region 212 may include geometrical elements that are all the same in shape but different in relative size.

Because of the light incident surface 210 having at least two light receiving regions with effectively different geometries, light beams, whether from a single light source or from a set of otherwise the same light sources, that enter the light guide plate 200 can be converted into light beams having at least two different incident angles. As such, at least two types of emission light beams having different emission performances can be obtained. In the present embodiment, the light incident surface 210 defines one first light receiving region 211 and one second light receiving region 212. It is to be understood that any potential variances in geometry (e.g., providing surface dots in one region and grooves in another) between each first light receiving region 211 and each second light receiving region 212 are considered to be within the scope of the present light guide plate, so long as they produce the desired effect of creating the at least two different incident angles.

In an advantageous embodiment, the first light receiving region 211 is in the form of a first micro-prism array 211 and the second light receiving region 212 is in the form of a second micro-prism array 212. The first micro-prism array 211 is composed of two or more first micro-prisms 211a, all having similar structure and size. In the first micro-prism array 211, the first micro-prisms 211a are triangular protrusions parallel in alignment, with equal intervals in between. Similarly, the second micro-prism array 212 is composed of two or more second micro-prisms 212a, all having similar structure and size. In the second micro-prism array 212, the second micro-prisms 212a are triangular indented (i.e., V-shaped) elements parallel in alignment, with equal intervals in between. The first micro-prism array 211 extends from the light emission surface 220 to the bottom surface 230. Similarly, the second micro-prism array 212 extends from the light emission surface 220 to the bottom surface 230.

In the first micro-prism array 211, each first micro-prism 211a has a longitudinal extending direction, i.e., a direction of the first micro-prism 211a perpendicularly extending between each of the bottom surface 230 and the emission surface 220. The light incident surface 210 also defines a longitudinal extending direction, i.e., a direction of the light incident surface 210 perpendicularly extending between each of the bottom surface 230 and the light emission surface 220. The longitudinal extending direction of the first micro-prism array 211 is parallel with that of the light incident surface 210.

As each first micro-prism 211a is convex, a projection profile of the first micro-prism 211a, when viewed along its longitudinal extending direction, may have a triangle shape (as shown in, e.g., FIG. 1), a rectangle shape, a trapezoid shape, an arcuate/circular section shape, a semicircle shape, a shape surrounded by a beeline and a curve, or another regular or irregular convex shapes. Alternatively, if the first micro-prism 211a is instead concavely shaped, a projection profile of the first micro-prism 211a, when viewed along its longitudinal extending direction, may have a U-shape, a V-shape (i.e., as per a triangularly indented portion), an arc-shape, or another regular or irregular concave shapes. In a beneficial embodiment, the first micro-prism array 211 is a triangular-prism array 211 and the second micro-prism array 212 is a V-shaped groove array 212. In the light incident surface 210, the first micro-prism array 211 and the second micro-prism array 212 are spaced by the flat surface 213 and are parallel to one another.

In the triangular-prism array 211, a vertex angle of each triangular-prism 211a may be in a range from above about zero degree (i.e., to have a discernable geometric element) to about 140 degrees. In the V-shaped groove array 212, a vertex angle of V-shaped groove may also be in a range also from above about zero degree (i.e., to have a discernable geometric element) to about 140 degrees. In the present embodiment, the vertex angle of each triangular-prism 211a and each V-shaped groove 212a is, as shown, equal to 100 degrees.

The light emission surface 220 includes at least two light emission regions. For example, the light emission surface 220 includes a first light emission region corresponding to the first light receiving region and a second emission region respectively corresponding to the second light receiving region. In detail, the light emission surface 220 includes a third micro-prism array 221 and a fourth micro-prism array 222. The third micro-prism array 221 is positioned corresponding to the first micro-prism array 211, and the fourth micro-prism array 222 is positioned corresponding to the second micro-prism array 212. For example, the third micro-prism array 221 perpendicularly intersects with the first micro-prism array 211 and the fourth micro-prism array 222 perpendicularly intersects with the second micro-prism array 212.

The third micro-prism array 221 may be constituted of two or more third micro-prisms 221a having similar structure and size. Similarly, the fourth micro-prism array 222 may be constituted of two or more fourth micro-prisms 222a having similar structure and size. The third micro-prism array 221 and the fourth micro-prism array 222 may have different structures and/or sizes, relative to each other. Advantageously, the structure of the third micro-prism array 221 is determined by the structure of the first micro-prism array 211. Similarly, the structure of the fourth micro-prism array 221 is, usefully, determined by the structure of the second micro-prism array 212. By such structures matching on the incident and emission surfaces, the incident and emission angles should be similar. In the present embodiment, the third micro-prism array 221 is a triangular-prism array, similar to the first micro-prism array 211. The fourth micro-prism array 222 is a V-shaped groove array, similar to the second micro-prism array 212. However, while matching structures on the incident and emission surfaces may prove advantageous in enhancing a desired lighting effect, it is to be understood that the present light guide plate also contemplates the use of structures on the incident and emission surfaces that do not necessarily match, including the possibility of using "mirror opposites" (e.g., triangular protrusions on one surface and similarly angled V-shaped indent structure on the opposing surface). Such "mirror opposites" could potentially be chosen so as to promote perpendicularly collimated light from the emission surface.

Figure 3:
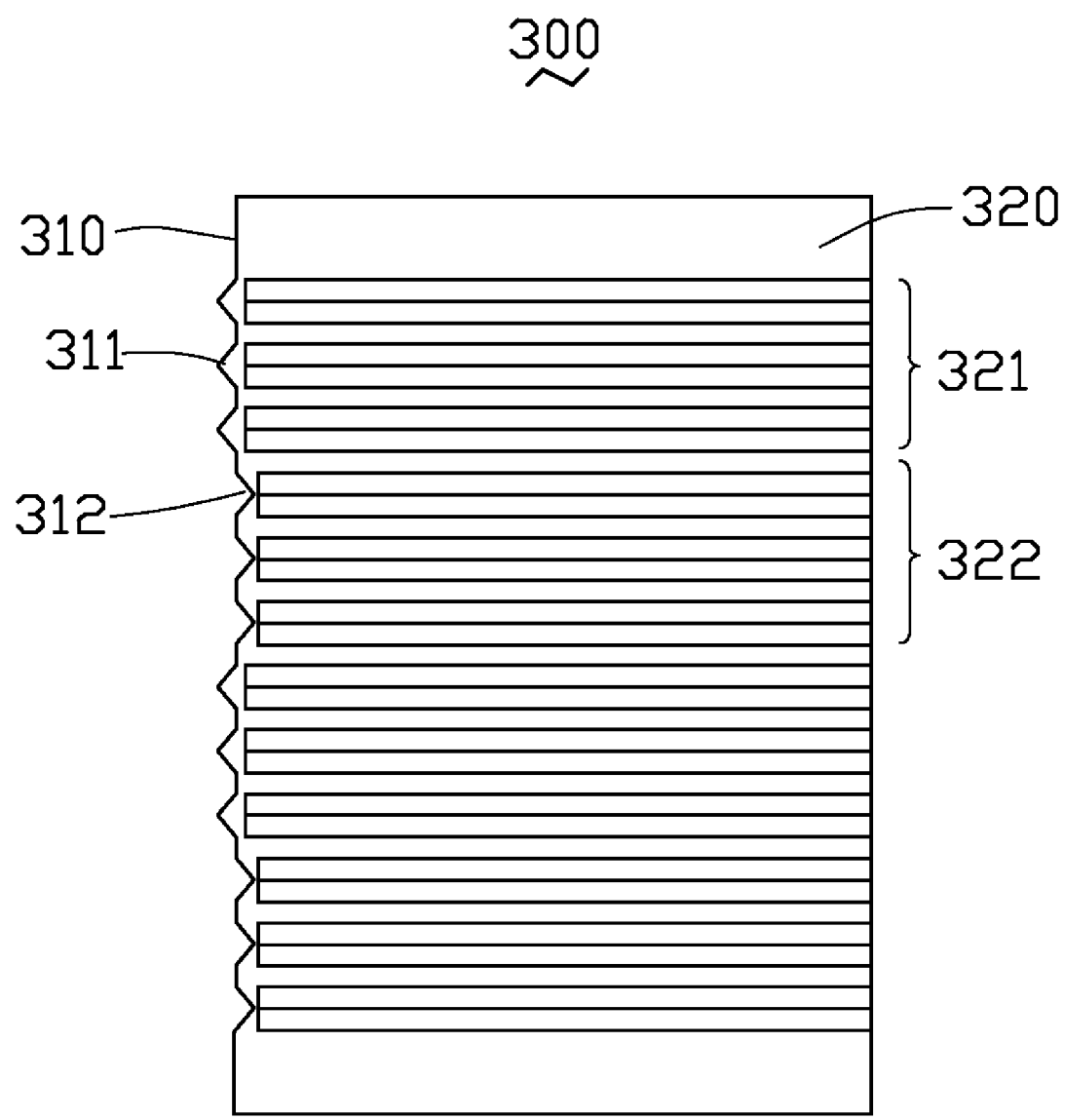
FIG. 3 is a top plan view of a light guide plate in accordance with a second present embodiment.

Referring to FIG. 3, a light guide plate 300 in accordance with a second embodiment is shown. The light guide plate 300 is similar to the light guide plate 200 of the first embodiment except the light guide plate 300 has a light incident surface 310 and a light emission surface 320. The light guide plate 300 includes a number of first micro-prism arrays 311 and a number of second micro-prism arrays 312 defined, alternately, in the light incident surface 310. For example, two sides of each first micro-prism array 311, respectively, provides a second micro-prism array 312, and two sides of each second micro-prism array 312, respectively, provides a first micro-prism array 311. The first micro-prism array 311 may be similar to the first micro-prism array 211 of the first embodiment, and the second micro-prism array 312 may be similar to the second micro-prism array 212 of the first embodiment. In the present embodiment, the light guide plate 300 includes two first micro-prism arrays 311 and two second micro-prism arrays 312. The first micro-prism array 311 and the second micro-prism array 312 are alternately located on the light incident surface 310.

The light emission surface 320 includes a number of third micro-prism arrays 321 and a number of fourth micro-prism arrays 322, alternately aligned thereon. For example, two sides of each third micro-prism array, respectively, provides a fourth micro-prism array 322, and two sides of each fourth micro-prism array 322, respectively, provides a third micro-prism array 321. In addition, two sides of each first micro-prism array may, respectively, provide two or more continuous second micro-prism arrays, or two sides of each second micro-prism array may, respectively, provide two or more continuous first micro-prism arrays. Each third micro-prism array 321 is positioned/aligned corresponding to the first micro-prism array 311, and each fourth micro-prism array 322 is positioned/aligned corresponding to the second micro-prism array 312. For example, the third micro-prism array 321 perpendicularly intersects with the first micro-prism array 311, and the fourth micro-prism array 322 perpendicularly intersects with the second micro-prism array 312. The third micro-prism array 321 may, e.g., be similar to the third micro-prism array 221 of the first embodiment, and the fourth micro-prism array 322 may, e.g., be similar to the fourth micro-prism array 222 of the first embodiment. In the present embodiment, the light guide plate 300 includes two third micro-prism arrays 321 and two fourth micro-prism arrays 322. The third micro-prism array 321 and the fourth micro-prism array 322 are alternately located on the light emission surface 320.

As to the above-described first and second embodiments, the light incident surface of the light guide plate defines at least two light receiving regions. Such two light receiving regions can direct or guide light beams from a single source or same light sources in two distinctly different manners due to their difference in configuration, thereby producing two ranges of incident angles and accordingly obtaining light emission beams with two characteristic performances. Therefore, various light sources are integrated with the light guide plate of the first and second embodiments and can obtain various backlight modules with multifunctional light emitting performances.

Figure 4:
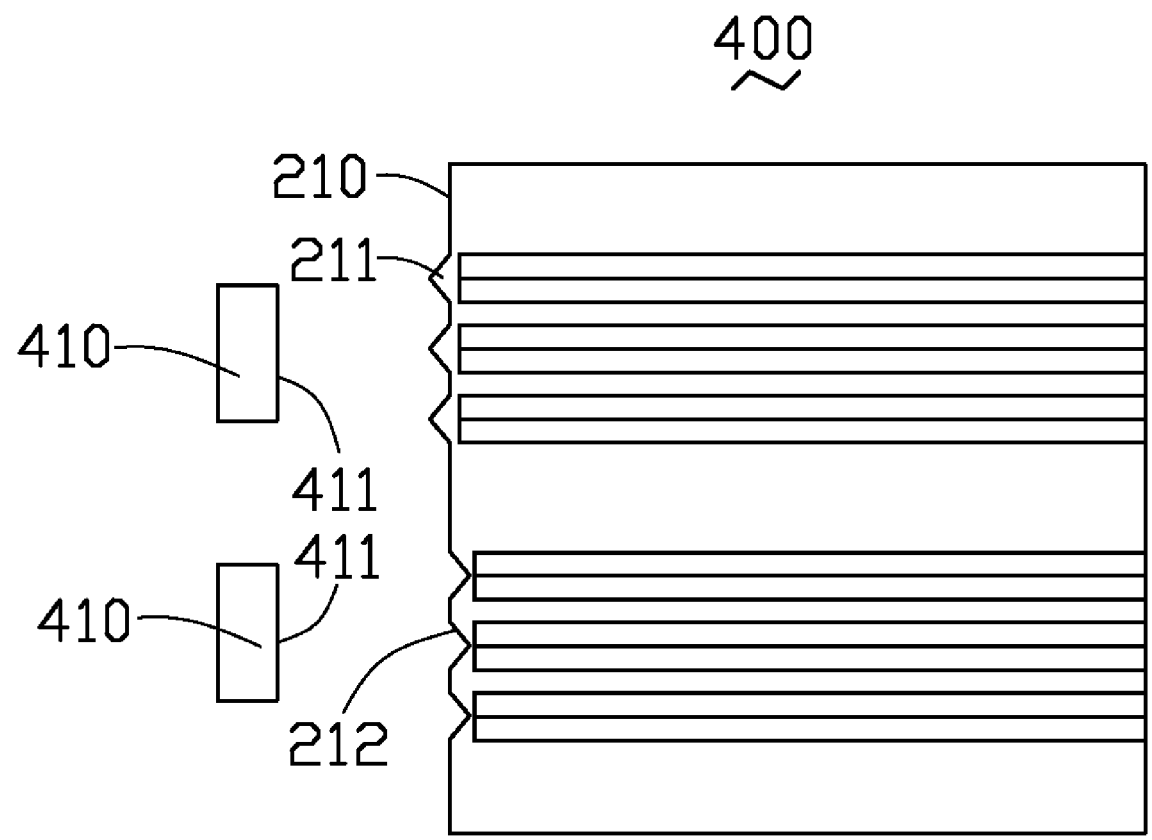
FIG. 4 is a top plan view of a backlight module including the light guide plate of the first present embodiment.

Referring to FIG. 4, a backlight module 400 adopting the light guide plate 200, in accordance with a third embodiment is illustrated. The backlight module 400 includes the light guide plate 200 and at least two light sources 410. The light guide plate 200 includes the first micro-prism array 211 and the second micro-prism array 212. The light sources 410 are positioned adjacent to the light incident surface 210 of the light guide plate 200. In the present embodiment, the light guide plate 200 includes two light receiving regions, i.e., the first micro-prism array 211 and the second micro-prism array 212. Two light sources 410 are provided for the two light receiving regions. One light source 410 is arranged corresponding to (i.e., in alignment with) the first micro-prism array 211 (e.g., opposed thereto), and the other light source 410 is arranged corresponding to (i.e., in alignment with) the second micro-prism array 212 (e.g., opposed thereto).

Figure 5:
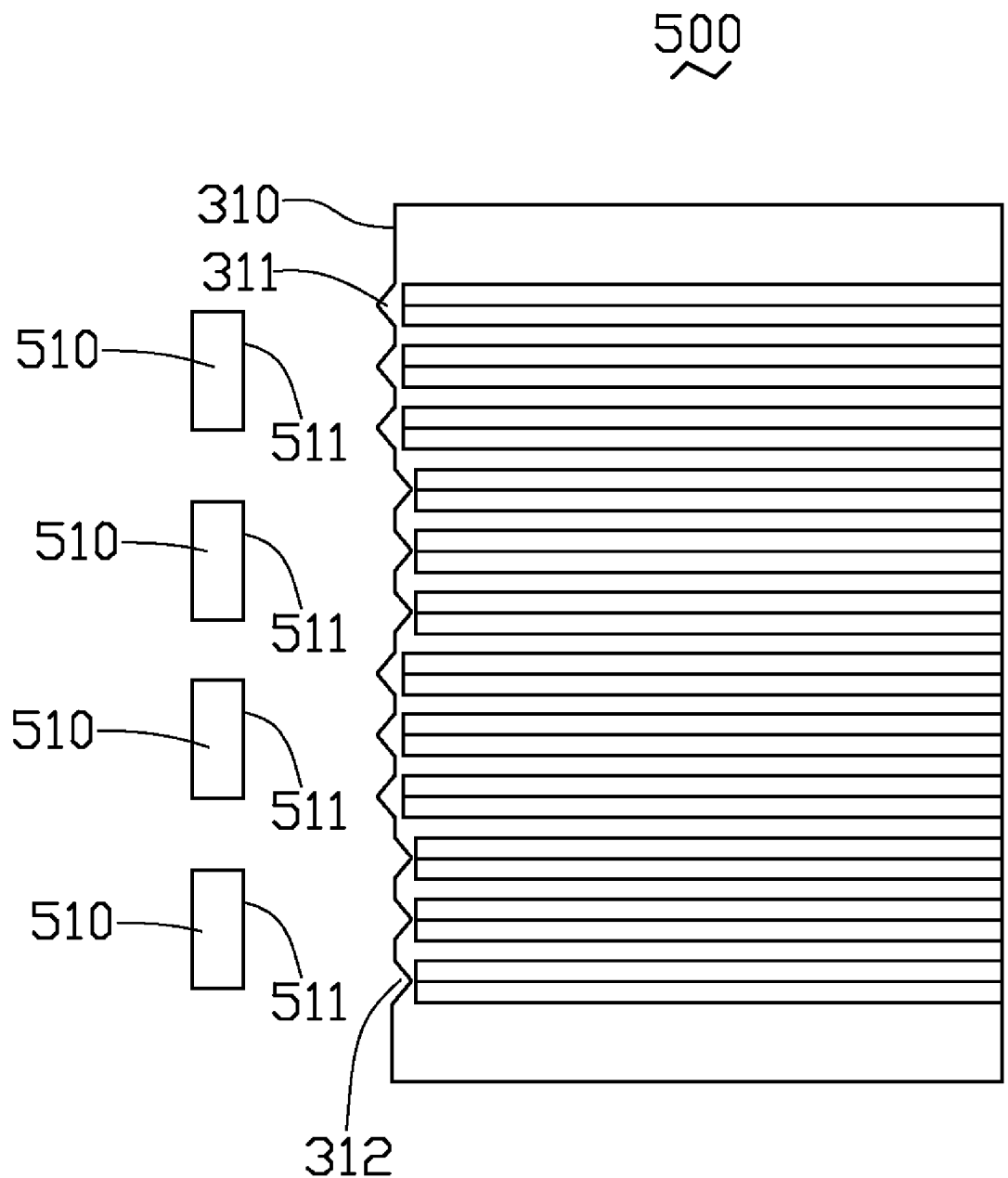
FIG. 5 is a top plan view of a backlight module including the light guide plate of the second present embodiment.
Figure 6:
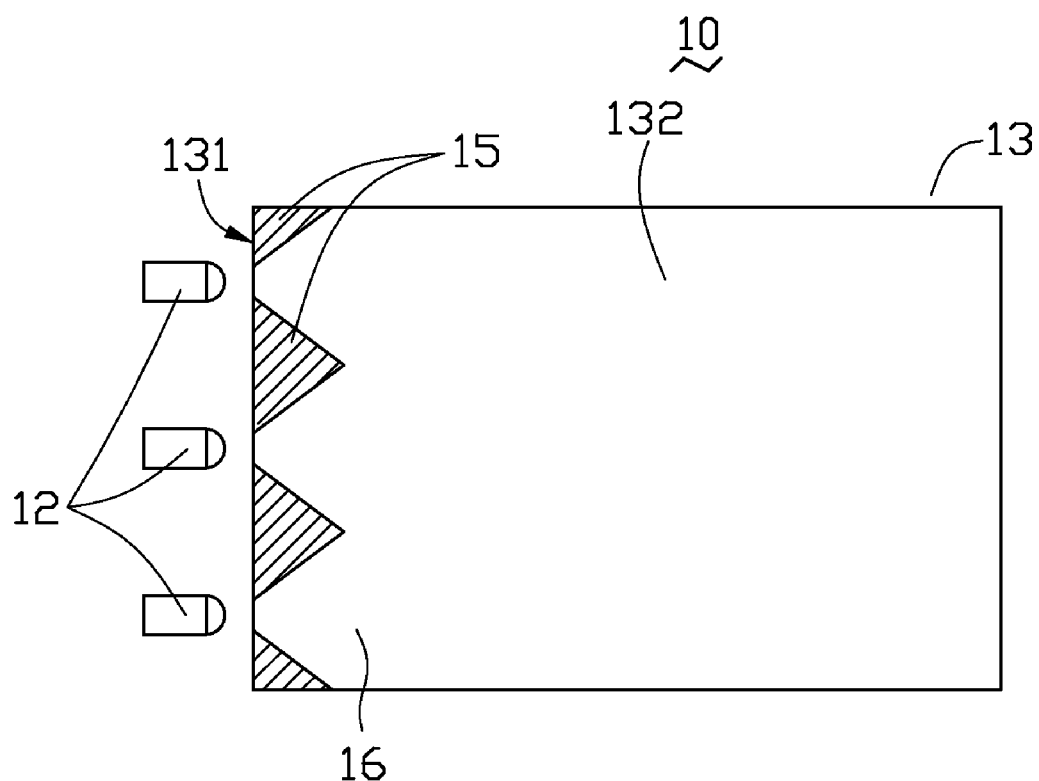
FIG. 6 is a top plan view of a conventional backlight module.
Figure 7:
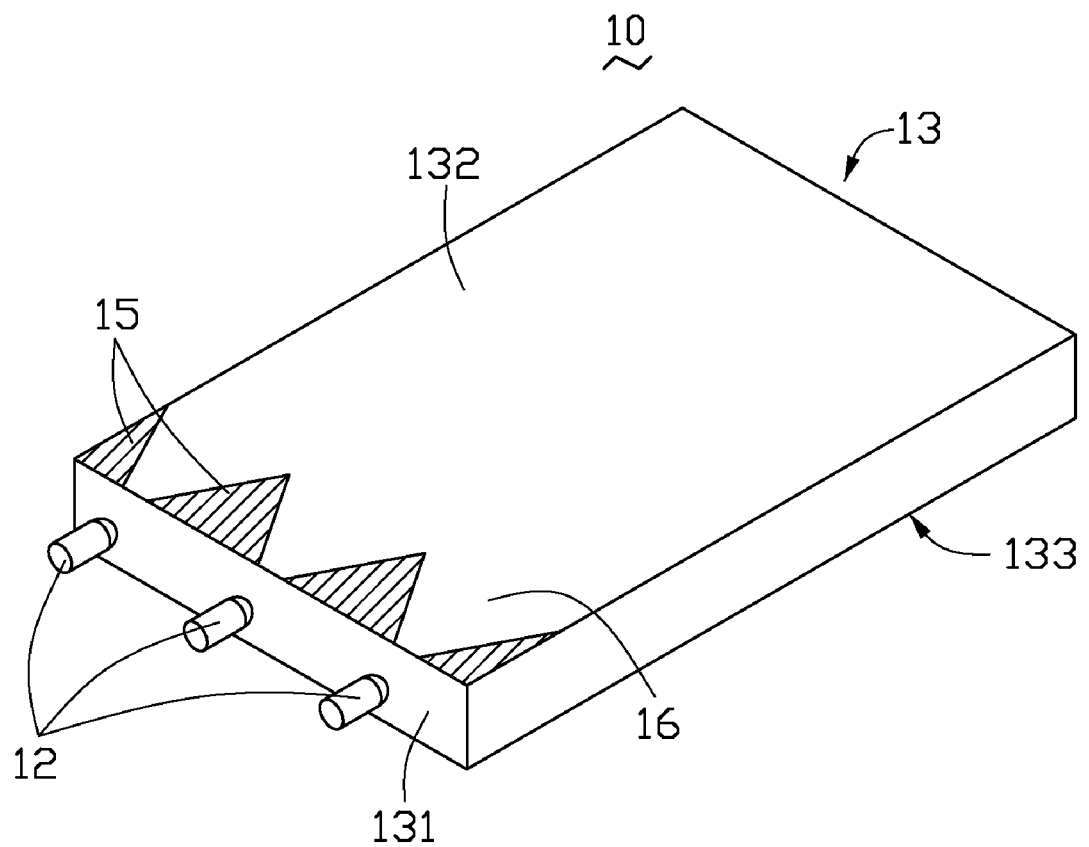
FIG. 7 is an isometric view of the backlight module of FIG. 6.

Referring to FIG. 5, a backlight module 500 adopting the light guide plate 300, in accordance with a fourth embodiment is illustrated. The backlight module includes the light guide plate 300 and a number of light sources 510. In the present embodiment, the light incident surface 310 of the light guide plate 300 has four light receiving regions (i.e., two first micro-prism arrays 311 and two second micro-prism arrays 312). The backlight module 500 includes four light sources 510, and each light source 510 has a light emission face 511. Each light source 510 is positioned corresponding to one light receiving region, with the light emission face 511 aligned, beneficially, directly opposite to a respective light receiving region.

As to the above-described third and fourth embodiments, the backlight module has the following advantages. Firstly, light beams produced from similar light sources enter the light guide plate from the first light receiving region (i.e., the first micro-prism arrays 211, 311) and then emit from the first light emission region (i.e., the third micro-prism arrays 221, 321) corresponding to the first light receiving region. Thus, an integration of the first light receiving region and the first light emission region can create a first type of light emission beam with a certain performance (e.g., brightness, uniformity, diffusion angle range). Secondly, light beams produced from a single source or similar or identical light sources enter the light guide plate from the second light receiving region (i.e., the second micro-prism arrays 212, 312) and then emit from the second light emission region (i.e., the third micro-prism arrays 222, 322) corresponding to the second light receiving region. Thus, another integration of the second light receiving region and the second light emission region can potentially create a second type of light emission beam with another certain performance (e.g., brightness, uniformity, diffusion angle range).

It is believed that the present embodiments and their advantages will be understood from the foregoing description and it will be apparent that various changes may be made thereto without departing from the spirit and scope of the invention or sacrificing all of its material advantages, the examples hereinbefore described merely being preferred or exemplary embodiments of the invention.

What is claimed is:

1. A light guide plate, comprising:
   a light incident surface comprising a plurality of first micro-prism arrays and a plurality of second micro-prism arrays;
   a top light emission surface comprising a plurality of third micro-prism arrays and a plurality of fourth micro-prism arrays; and
   a bottom surface;
   wherein the light incident surface is positioned between the top light emission surface and the bottom surface, the first and second micro-prism arrays extend from the bottom surface to the top light emission surface, each first micro-prism array is perpendicular to and aligned with a corresponding third micro-prism array, each second micro-prism array is perpendicular to and aligned with a corresponding fourth micro-prism array, each first micro-prism array is comprised of a plurality of convex elements extending beyond the light incident surface, each second micro-prism array is comprised of a plurality of concave elements defined in the light incident surface, each third micro-prism array is comprised of a plurality of convex elements extending beyond the top light emission surface, and each fourth micro-prism array is comprised of a plurality of concave elements defined in the top light emission surface.

2. The light guide plate as claimed in claim 1, wherein the first micro-prism arrays and the second micro-prism arrays are alternately aligned.

3. The light guide plate as claimed in claim 1, wherein the light incident surface further comprises a plurality of flat surfaces, and each flat surface is positioned between two adjacent first and second micro-prism arrays.

4. A backlight module, comprising:
   at least two light sources; and
   a light guide plate comprising:
      a top light emission surface and a bottom surface; and
      a light incident surface between the top light emission surface and the bottom surface, the light incident surface adjacent to the at least two light sources, and comprising a plurality of first micro-prism arrays and a plurality of second micro-prism arrays, wherein the first and second micro-prism arrays extend from the bottom surface to the top light emission surface, each first micro-prism array is comprised of a plurality of triangular-shaped convex elements extending beyond the light incident surface, each second micro-prism array is comprised of a plurality of V-shaped concave elements defined in the light incident surface, and the vertex angle of each triangular-shaped convex element is equal to the vertex angle of each V-shaped concave element.

5. The backlight module as claimed in claim 4, wherein the vertex angle of each triangular-shaped convex element and each V-shaped concave element is about 100 degrees.

6. The backlight module as claimed in claim 4, wherein the first micro-prism arrays and the second micro-prism arrays are alternately aligned.

7. The backlight module as claimed in claim 4, wherein the light incident surface comprises a plurality of flat surfaces, and each flat surface is positioned between two adjacent first and second micro-prism arrays.

8. The backlight module as claimed in claim 4, wherein the top light emission surface comprises a plurality of third micro-prism arrays and a plurality of fourth micro-prism arrays, each first micro-prism array is perpendicular to and aligned with a corresponding third micro-prism array, each second micro-prism array is perpendicular to and aligned with a corresponding fourth micro-prism array, each third micro-prism array is comprised of a plurality of triangular-shaped convex elements extending beyond the top light emission surface, and each fourth micro-prism array is comprised of a plurality of V-shaped concave elements defined in the top light emission surface.

9. The backlight module as claimed in claim 4, wherein the triangular-shaped convex elements of each first micro-prism array are parallel to each other and spaced apart from each other on the light incident surface, and the V-shaped concave elements of each second micro-prism array are parallel to each other and defined separately from each other in the light incident surface.

10. The backlight module as claimed in claim 8, wherein the triangular-shaped convex elements of each third micro-prism array are parallel to each other and spaced apart from each other on the top light emission surface, and the V-shaped concave elements of each fourth micro-prism array are parallel to each other and defined separately from each other in the top light emission surface.

\* \* \* \* \*